(12) United States Patent
Bryant et al.

(10) Patent No.: US 7,900,014 B2
(45) Date of Patent: *Mar. 1, 2011

(54) MEMORY REQUEST/GRANT DAEMONS IN VIRTUAL NODES FOR MOVING SUBDIVIDED LOCAL MEMORY SPACE FROM VN TO VN IN NODES OF A MASSIVELY PARALLEL COMPUTER SYSTEM

(75) Inventors: Jay Symmes Bryant, Rochester, MN (US); Nicholas Bruce Goracke, Rochester, MN (US); Daniel Paul Kolz, Rochester, MN (US); Dharmesh J. Patel, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 140 days.

This patent is subject to a terminal disclaimer.

(21) Appl. No.: 12/171,477

(22) Filed: Jul. 11, 2008

(65) Prior Publication Data

US 2008/0270731 A1 Oct. 30, 2008

Related U.S. Application Data

(63) Continuation of application No. 11/463,079, filed on Aug. 8, 2006, now Pat. No. 7,428,629.

(51) Int. Cl.
*G06F 15/16* (2006.01)

(52) U.S. Cl. .................. 711/170; 711/153; 711/173; 712/14

(58) Field of Classification Search .................. None
See application file for complete search history.

(56) References Cited

U.S. PATENT DOCUMENTS

| | | | |
|---|---|---|---|
| 4,811,216 A | 3/1989 | Bishop et al. | |
| 5,559,980 A | 9/1996 | Connors et al. | |
| 5,623,641 A | 4/1997 | Kadoyashiki | |
| 5,625,836 A | 4/1997 | Barker et al. | |
| 6,266,745 B1 | 7/2001 | de Backer et al. | |
| 6,341,338 B1 | 1/2002 | Dennie | |
| 6,360,303 B1 | 3/2002 | Wisler et al. | |
| 6,381,682 B2 * | 4/2002 | Noel et al. | 711/153 |
| 2007/0250604 A1 | 10/2007 | Wu et al. | |

* cited by examiner

*Primary Examiner*—Kenneth S Kim
(74) *Attorney, Agent, or Firm*—Roy W. Truelson

(57) ABSTRACT

A memory management mechanism a nodal having multiple processors in a massively parallel computer system dynamically configures nodal memory on demand. A respective variable-sized subdivision of nodal memory is associated with each processor in the node. A processor may request additional memory, and the other processor(s) may grant or veto the request. If granted, the requested memory is added to the subdivision of the requesting processor. A processor can only access memory within its own subdivision. Preferably, each subdivision contains a daemon which monitors memory usage and generates requests for additional memory.

12 Claims, 7 Drawing Sheets

MEMORY REQUEST/GRANT DAEMONS IN VIRTUAL NODES FOR MOVING SUBDIVIDED LOCAL MEMORY SPACE FROM VN TO VN IN NODES OF A MASSIVELY PARALLEL COMPUTER SYSTEM

CROSS REFERENCE TO RELATED APPLICATION

This is a continuation of pending U.S. patent application Ser. No. 11/463,079, filed Aug. 8, 2006, originally entitled "Method and Apparatus for Subdividing Local Memory in Nodes of a Massively Parallel Computer System", and by amendment entitled "Memory Request/Grant Daemons in Virtual Nodes for Moving Subdivided Local Memory Space from VN to VN in Nodes of a Massively Parallel Computer System", which is herein incorporated by reference. This application claims priority under 35 U.S.C. §120 of U.S. patent application Ser. No. 11/463,079, filed Aug. 8, 2006.

FIELD OF THE INVENTION

The present invention relates to digital data processing, and in particular to the operation of massively parallel computer systems comprising multiple nodes, each node having multiple processors and a common nodal memory.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modem computer system typically comprises one or more central processing units (CPU) and supporting hardware necessary to store, retrieve and transfer information, such as communication buses and memory. It also includes hardware necessary to communicate with the outside world, such as input/output controllers or storage controllers, and devices attached thereto such as keyboards, monitors, tape drives, disk drives, communication lines coupled to a network, etc. The CPU or CPUs are the heart of the system. They execute the instructions which comprise a computer program and directs the operation of the other system components.

From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Sophisticated software at multiple levels directs a computer to perform massive numbers of these simple operations, enabling the computer to perform complex tasks. What is perceived by the user as a new or improved capability of a computer system is made possible by performing essentially the same set of very simple operations, but doing it much faster, and thereby enabling the use of software having enhanced function. Therefore continuing improvements to computer systems require that these systems be made ever faster.

The overall speed of a computer system (also called the throughput) may be crudely measured as the number of operations performed per unit of time. Conceptually, the simplest of all possible improvements to system speed is to increase the clock speeds of the various components, and particularly the clock speed of the processor(s). E.g., if everything runs twice as fast but otherwise works in exactly the same manner, the system will perform a given task in half the time. Enormous improvements in clock speed have been made possible by reduction in component size and integrated circuitry, to the point where an entire processor, and in some cases multiple processors along with auxiliary structures such as cache memories, can be implemented on a single integrated circuit chip. Despite these improvements in speed, the demand for ever faster computer systems has continued, a demand which can not be met solely by further reduction in component size and consequent increases in clock speed. Attention has therefore been directed to other approaches for further improvements in throughput of the computer system.

Without changing the clock speed, it is possible to improve system throughput by using multiple processors. The modest cost of individual processors packaged on integrated circuit chips has made this approach practical. Although the use of multiple processors creates additional complexity by introducing numerous architectural issues involving data coherency, conflicts for scarce resources, and so forth, it does provide the extra processing power needed to increase system throughput.

Various types of multi-processor systems exist, but one such type of system is a massively parallel nodal system for computationally intensive applications. Such a system typically contains a large number of processing nodes, each node having its own processor or processors and local (nodal) memory, where the nodes are arranged in a regular matrix or lattice structure. The system contains a mechanism for communicating data among different nodes, a control mechanism for controlling the operation of the nodes, and an I/O mechanism for loading data into the nodes from one or more I/O devices and receiving output from the nodes to the I/O device(s). In general, each node acts as an independent computer system in that the addressable memory used by the processor is contained entirely within the processor's local node, and the processor has no capability to directly reference data addresses in other nodes. However, the control mechanism and I/O mechanism are shared by all the nodes.

A massively parallel nodal system such as described above is a general-purpose computer system in the sense that it is capable of executing general-purpose applications, but it is designed for optimum efficiency when executing computationally intensive applications, i.e., applications in which the proportion of computational processing relative to I/O processing is high. In such an application environment, each processing node can independently perform its own computationally intensive processing with minimal interference from the other nodes. An inter-nodal data communication matrix supports cooperation among nodes in processing large applications in parallel. Optimally, I/O workload is relatively small in comparison to the collective processing capabilities of the nodes' processors, because the limited I/O resources would otherwise become a bottleneck to performance.

In a massively parallel nodal system, a single node may contain a single processor (sometimes called a processor core), or may contain multiple processors. In some massively parallel systems, multiple processors within a node can act as independent processing entities, each executing a respective user application process and maintaining process state independently.

An exemplary massively parallel nodal system is the IBM Blue Gene™ system. The IBM Blue Gene system contains many processing nodes, each having multiple processors and a common local (nodal) memory. The processing node are arranged in a logical three-dimensional torus network having point-to-point data communication links between each node and its immediate neighbors in the network. Additionally, each node can be configured to operate either as a single node (coprocessor mode) or as multiple virtual nodes (virtual node mode), thus providing a fourth dimension of the logical network.

In coprocessor mode, one of the processors acts as a primary processor directing the execution of a user application process, while the other processor or processors act as coprocessors for performing tasks assigned by the primary processor, such as I/O operations. In coprocessor mode, the entire nodal memory is dedicated to the threads being executed by the primary processor and is directly addressable by the primary processor. In multi-processor or "virtual node" mode, each processor acts independently of the other, executing a respective user application process and maintaining a process state independently. The processes executing in the different processors in virtual node mode may be, and usually are, parts of a common user application, although they need not be.

The architecture of the certain massively parallel nodal systems such as IBM Blue Gene systems is designed around the idea that each node has its own independent state and independent memory. When a node is configured to run in multiprocessor mode, each processor portion of the node should act, for most purposes, as if it were an independent node. In particular, each processor portion of the node should have its own independent memory, directly addressable by it alone and not by other processors, including the other processor or processors in the same node. Since the node contains a single common physical memory, it is desirable that this memory be subdivided among the processors on a fixed basis, so that each processor has its own portion.

Subdividing of the local nodal memory is a relatively static operation. A process executing in a local memory portion generally needs to be guaranteed that memory once there will stay there for the duration of the process, or data may be lost. Existing Blue Gene systems partition the local memory in fixed, discrete, equal partitions for each processor when configured to run in multiprocessor mode. Unfortunately, some processes require or optimally execute using more memory than the fixed portion, while others require less. It is generally difficult or impossible to predict the memory requirements of processes in advance.

It would be desirable to provide some form of dynamic or variable subdividing of the nodal memory in a massively parallel nodal system having multiple processors in each node, while at the same time preventing memory starvation of processes and maintaining architectural constraints of isolating the processes of different processors. It would further be desirable to provide a software-based mechanism for subdividing nodal memory, which does not require special hardware support.

SUMMARY OF THE INVENTION

A nodal memory management mechanism for a common physical memory used by multiple processors in a node of a massively parallel nodal computer system dynamically configures nodal memory on demand of processes executing in the node's processors, subject to the requirements of other processors in the node. A respective variable-sized subdivision of local memory is associated with each processor in the node. A processor requiring additional memory may request it. If the requested block or blocks are not needed for use by other processors, the request may be granted and the requested memory added to the subdivision of the requesting processor. A processor can only access memory within its own subdivision.

In the preferred embodiment, there are two processors in each node, and local memory is subdivided into three subdivisions by moveable boundaries. At any instant in time, a particular local memory address may be in the subdivision of a particular processor, or may be in the unattached subdivision, but may not be in more than one subdivision. A block of memory, once added to the subdivision of a particular processor, remains attached to that subdivision for the duration of the executing process. When a new process is initiated after the originally executing process terminates, the subdivision boundary is reset to a default location providing a minimum amount of memory to the new process. Depending on the operating system and other factors, it may alternatively be possible in some environments to detach a block or memory from the subdivision while a process is executing, but this may involve considerable overhead complexity to assure data integrity.

In the preferred embodiment, each processor's memory subdivision includes a record of available memory addresses and a memory regulation daemon. If the executing process requires additional memory, the daemon checks the record, and if a block is available, sends a request for the additional block to the daemon(s) of the other processor(s). The request includes a priority or reason code associated with the request. The non-requesting daemon(s) may veto the request based on the priority or reason code associated with the request and expected memory requirements of the other processor(s). It would alternatively be possible to use other mechanisms to attach memory blocks on request of a processor.

In the preferred embodiment, the local node may operate in either a multiprocessor or "virtual node" mode, in which multiple independent processes execute in respective processors within each node, or in a coprocessor mode in which a single processor acts as a primary processor for the node and directs the execution of processes. Dynamic configuration of nodal memory is performed only in multiprocessor mode. When executing in coprocessor mode, the entire nodal memory is accessible by the primary processor. It would alternatively be possible for the system to always operate the local nodes in a multiprocessor mode.

By dynamically adjusting the size of nodal memory subdivisions on demand, a massively parallel system using multiprocessor nodes can more efficiently utilize the multiple processor capability of the various nodes and execute processes having different memory requirements independently on different processors of the same node. A dynamic nodal memory regulation mechanism as herein described is implemented entirely in software without any special hardware support, and requires relatively little overhead to implement.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
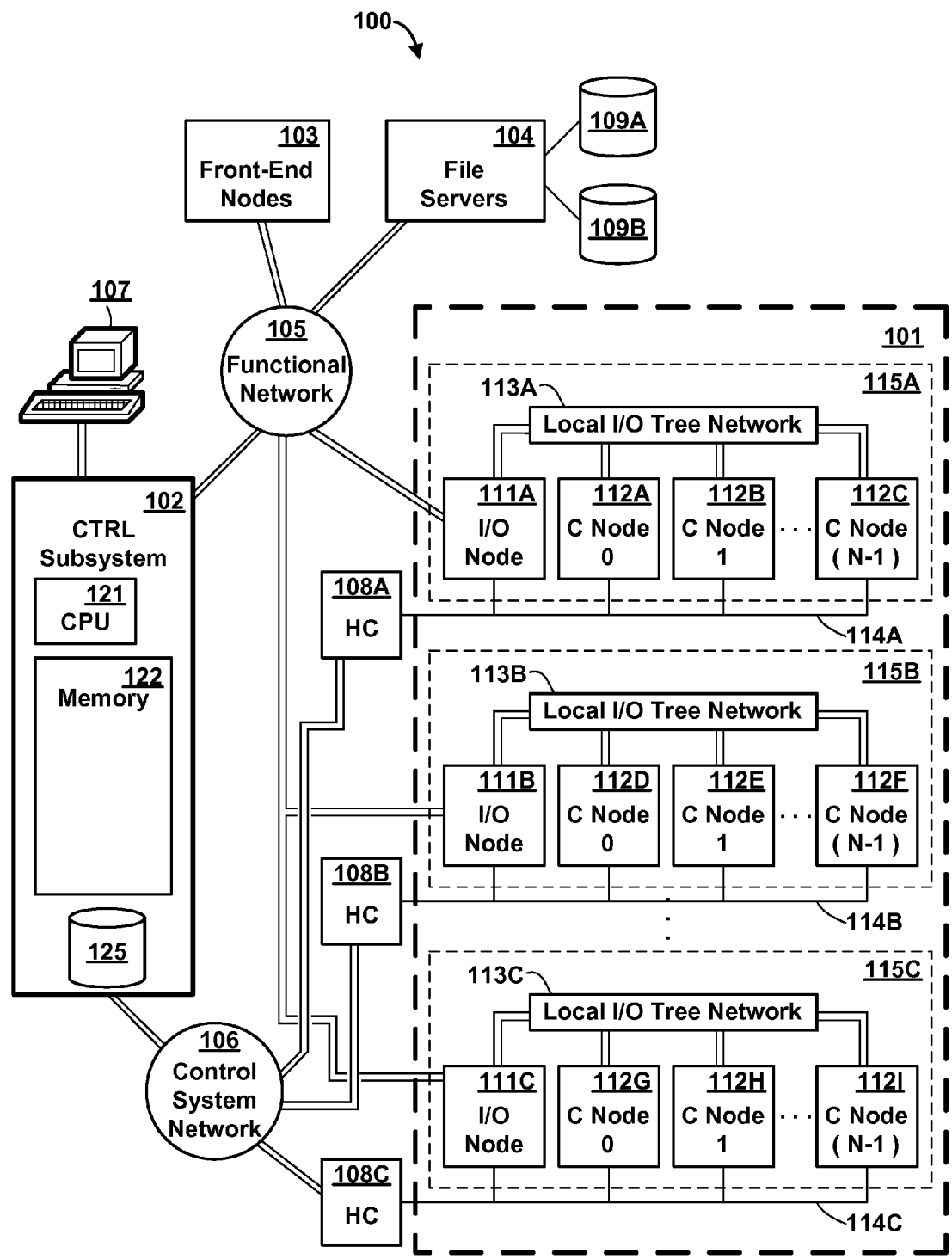
FIG. 1 is a high-level block diagram of the major components of a massively parallel computer system, in accordance with the preferred embodiment of the present invention.

Referring to the Drawing, wherein like numbers denote like parts throughout the several views, FIG. 1 is a high-level block diagram of the major hardware components of a massively parallel computer system 100 in accordance with the preferred embodiment of the present invention. In the preferred embodiment, computer system 100 is an IBM Blue Gene™ computer system, it being understood that other computer systems could be used, and the description of a preferred embodiment herein is not intended to limit the present invention to the particular architecture described. Additional background information concerning the architecture of an IBM Blue Gene™ computer system can be found in the following commonly owned, copending U.S. patents, patent applications and PCT application designating the United States, each of which are herein incorporated by reference:

U.S. Pat. No. 7,313,582, issued Dec. 25, 2007, entitled "Arithmetic Functions in Torus and Tree Network";

U.S. patent application Ser. No. 10/469,000, filed Feb. 25, 2002, entitled "Global Tree Network for Computing Structure";

U.S. patent application Ser. No. 10/468,993, filed Feb. 25, 2002, entitled "Novel Massively Parallel Supercomputer";

U.S. Pat. No. 7,210,088, issued Apr. 24, 2007, entitled "Fault Isolation Through No-Overhead Link Level CRC";

U.S. patent application Ser. No. 10/468,997, filed Feb. 25, 2002, entitled "Global Interrupt and Barrier Networks";

PCT patent application US 2005/025616, filed Jul. 19, 2004, entitled "Collective Network for Computer Structures", published as WO 2006/020298 A2;

U.S. patent application Ser. No. 11/279,620, filed Apr. 13, 2006, entitled "Executing an Allgather Operation on a Parallel Computer"; and U.S. patent application Ser. No. 11/316,247 by Bryant et al., entitled "Method and Apparatus for Improving Block Allocation Times in a Computer System".

Computer system 100 comprises a compute core 101 having a large number of compute nodes arranged in a regular array or matrix, which collectively perform the bulk of the useful work performed by system 100. The operation of computer system 100 including compute core 101 is generally controlled by control subsystem 102. Various additional processors contained in front-end nodes 103 perform certain auxiliary data processing functions, and file servers 104 provide an interface to data storage devices such as rotating magnetic disk drives 109A, 109B, or other I/O (not shown). Functional network 105 provides the primary data communications path among the compute core 101 and other system components. For example, data stored in storage devices attached to file servers 104 is loaded and stored to other system components through functional network 105.

Compute core 101 comprises I/O nodes 111A-C (herein generically referred to as feature 111) and compute nodes 112A-J (herein generically referred to as feature 112). Compute nodes 112 are the workhorse of the massively parallel system 100, and are intended for executing compute-intensive applications which may require a large number of processes proceeding in parallel. I/O nodes 111 handle I/O operations on behalf of the compute nodes. Each I/O node contains an I/O processor and I/O interface hardware for handling I/O operations for a respective set of N compute nodes 112, the I/O node and its respective set of N compute nodes being referred to as a Pset. Compute core 101 contains M Psets 115A-115C (herein referred to as feature 115), each containing a single I/O node 111 and N compute nodes 112, for a total of M×N compute nodes 112. The product M×N can be very large. For example, in one implementation M=1024 (1K) and N=64, for a total of 64K compute nodes.

In general, application programming code and other data input required by the compute core for executing user application processes, as well as data output produced by the compute core as a result of executing user application processes, is communicated externally of the compute core over functional network 105. The compute nodes within a Pset 115 communicate with the corresponding I/O node over a corresponding local I/O tree network 113A-C (herein generically referred to as feature 113). The I/O nodes in turn are attached to functional network 105, over which they communicate with I/O devices attached to file servers 104, or with other system components. Thus, the local I/O tree networks 113 may be viewed logically as extensions of functional network 105, and like functional network 105 are used for data I/O, although they are physically separated from functional network 105.

Control subsystem 102 directs the operation of the compute nodes 112 in compute core 101. Control subsystem 102 is preferably a mini computer system including its own processor or processors 121, internal memory 122, and local storage device 125, and having an attached console 107 for interfacing with a system administrator or similar person. Control subsystem 102 includes an internal database which maintains certain state information for the compute nodes in core 101, and a control application (not shown) resident in memory 122 and executing on the control subsystem's processor(s) 121 which controls the allocation of hardware in compute core 101, directs the pre-loading of data to the compute nodes, and performs certain diagnostic and maintenance functions. Control system communicates control and state information with the nodes of compute core 101 over control system network 106. Network 106 is coupled to a set of hardware controllers 108A-C (herein generically referred to as feature 108). Each hardware controller communicates with the nodes of a respective Pset over a corresponding local hardware control network 114A-C (herein generically referred to as feature 114). The hardware controllers 108 and local hardware control networks 114 may be considered logically as extensions of control system network 106, although they are physically separate. The control system network and local hardware control network operates at a lower data rate than the functional network 105.

In addition to control subsystem 102, front-end nodes 103 comprise a collection of processors and memory which perform certain auxiliary functions which, for reasons of efficiency or otherwise, are best performed outside the compute core. Functions which involve substantial I/O operations are generally performed in the front-end nodes. For example, interactive data input, application code editing, or other user interface functions are generally handled by front-end nodes 103, as is application code compilation. Front-end nodes 103 are coupled to functional network 105 for communication with file servers 104, and may include or be coupled to interactive workstations (not shown).

Figure 2:
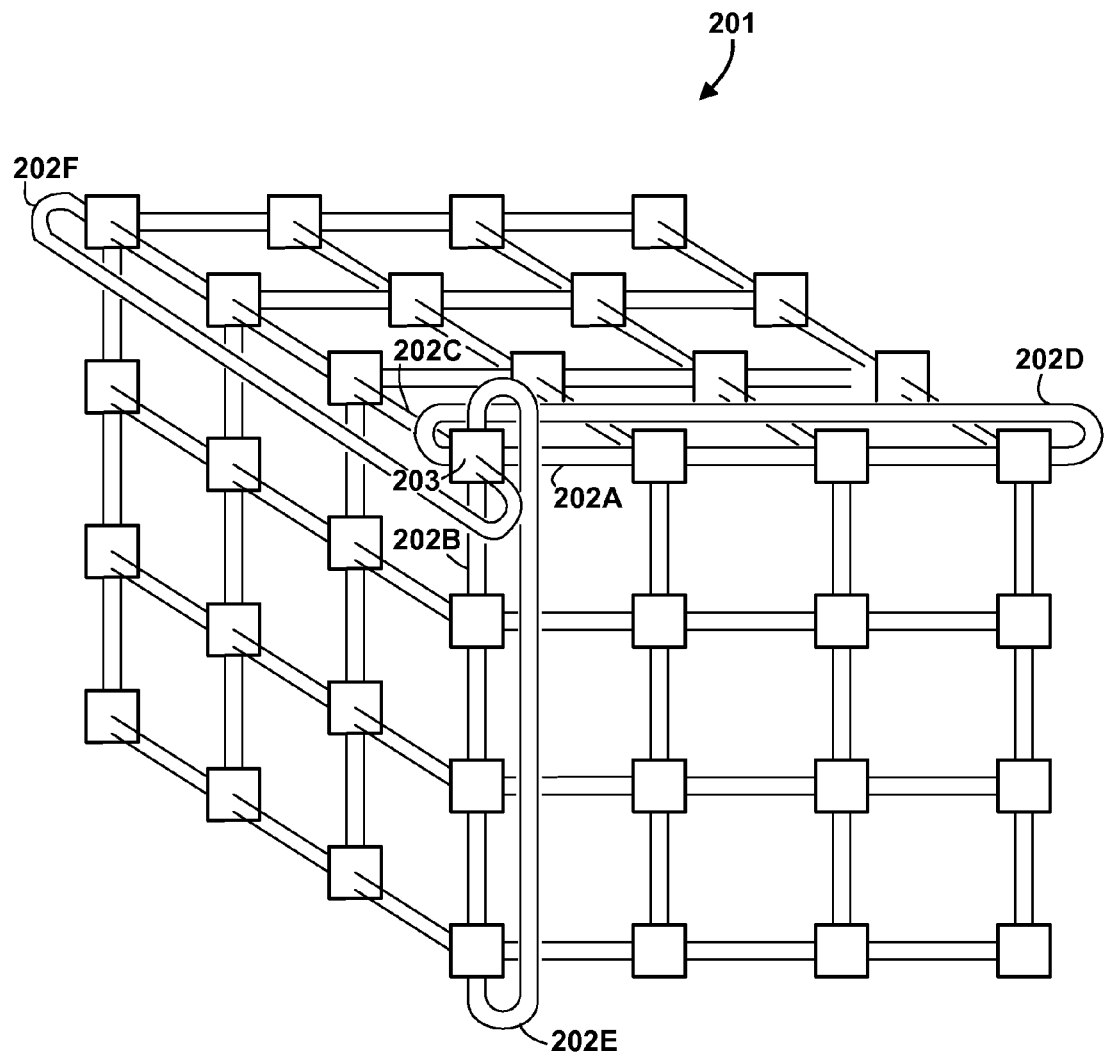
FIG. 2 is a simplified representation of a three dimensional lattice structure and inter-nodal communication network of the system of FIG. 1, according to the preferred embodiment.

Compute nodes 112 are logically arranged in a three dimensional lattice, each compute node having a respective x, y and z coordinate. FIG. 2 is a simplified representation of the three dimensional lattice structure 201. Referring to FIG. 2, a simplified 4×4×4 lattice is shown, in which the interior nodes of the lattice are omitted for clarity of illustration. Although a 4×4×4 lattice (having 64 nodes) is represented in the simplified illustration of FIG. 2, it will be understood that the actual number of compute nodes in the lattice is typically much larger. Each compute node in lattice 201 contains a set of six node-to-node communication links 202A-F (herein referred to generically as feature 202) for communicating data with its six immediate neighbors in the x, y and z coordinate dimensions. The node lattice logically wraps to form a torus in all three coordinate directions, and thus has no boundary nodes. E.g., if the node lattice contains dimx nodes in the x-coordinate dimension ranging from 0 to (dimx−1), then the neighbors of Node((dimx−1), y0, z0) include Node((dimx−2), y0, z0) and Node (0, y0, z0), and similarly for the y-coordinate and z-coordinate dimensions. This is represented in FIG. 2 by links 202D, 202E, 202F which wrap around from a last node in an x, y and z dimension, respectively to a first, so that node 203, although it appears to be at a "corner" of the lattice, has six node-to-node links 202A-F.

The aggregation of node-to-node communication links 202 is referred to herein as the torus network. The torus network permits each compute node to communicate results of data processing tasks to neighboring nodes for further processing in certain applications which successively process data in different nodes. However, it will be observed that the torus network contains only a limited number of links, and data flow is optimally supported when running generally parallel to the x, y or z coordinate dimensions, and when running to successive neighboring nodes. For this reason, applications requiring the use of a large number of nodes may subdivide computation tasks into groupings of logically adjacent nodes in a manner to support a logical data flow, where the nodes within any group may execute a common application code function or sequence.

Figure 3A:
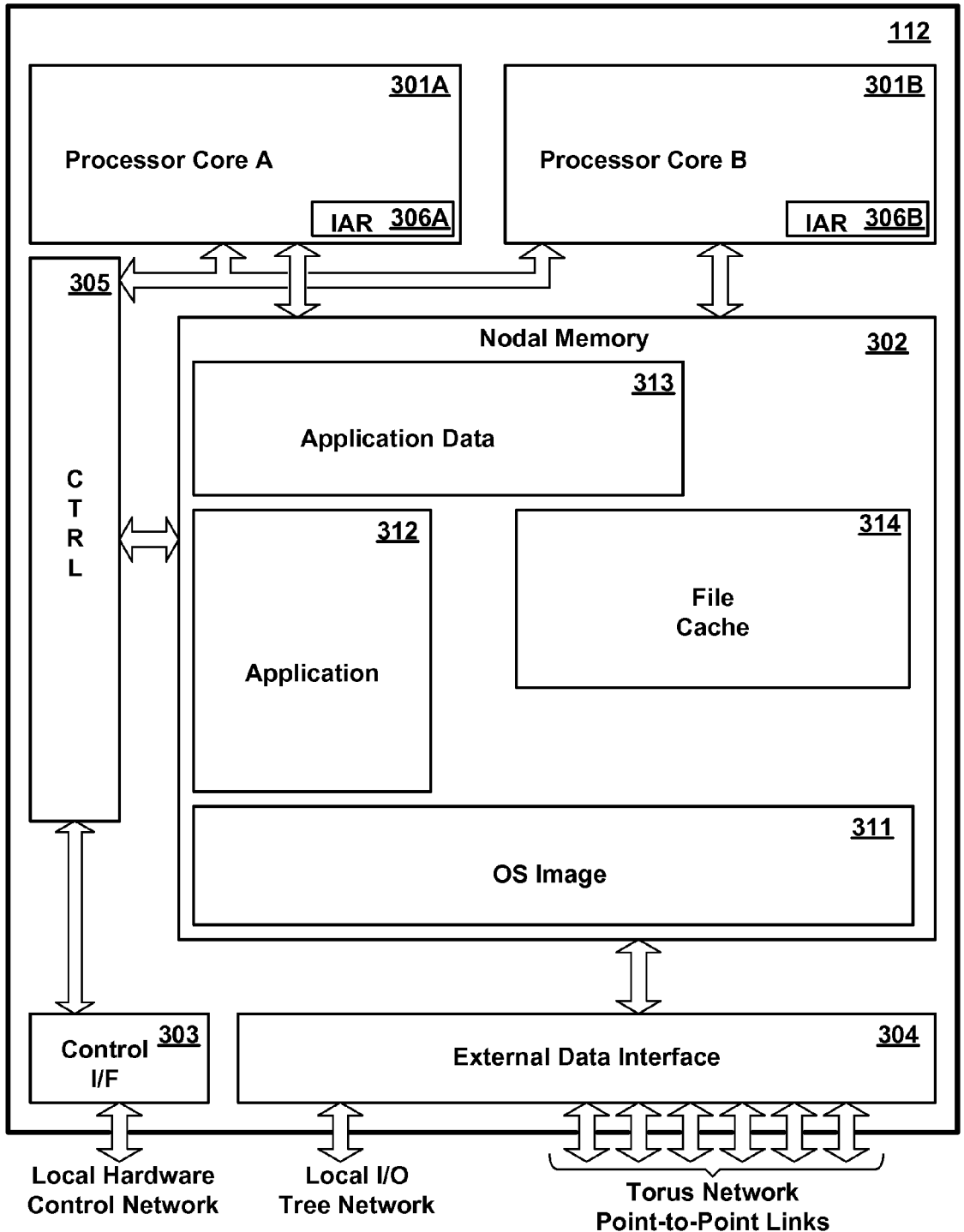
FIG. 3A is a high-level diagram of a compute node of the system of FIG. 1, configured according to a coprocessor operating mode, according to the preferred embodiment.
Figure 3B:
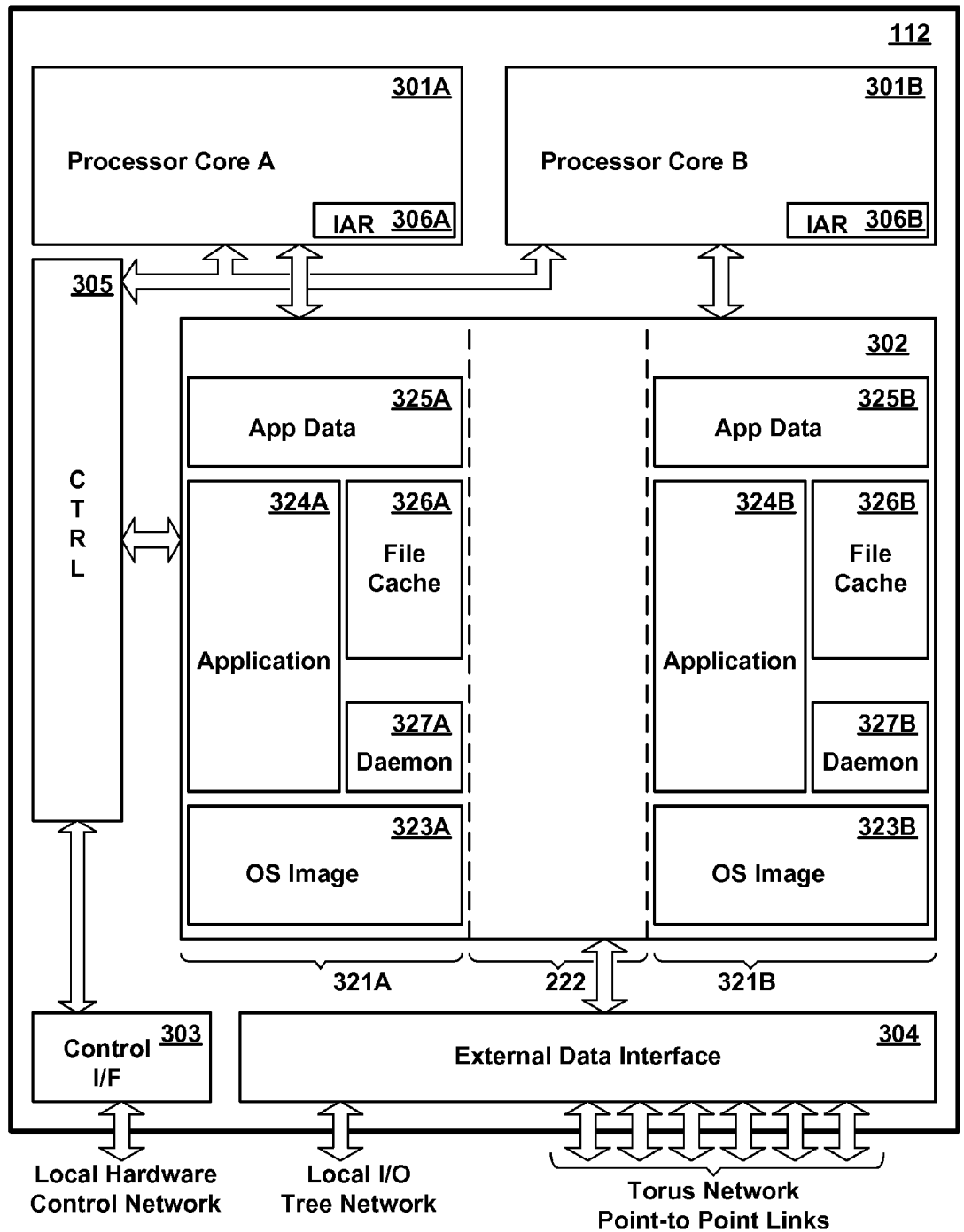
FIG. 3B is a high-level diagram of a compute node of the system of FIG. 1, configured according to a virtual node operating mode, according to the preferred embodiment.

FIGS. 3A and 3B are high-level block diagrams of the major hardware and software components of a compute node 112 of computer system 100 configured in different operating modes in accordance with the preferred embodiment, FIG. 3A representing a compute node configured according to a coprocessor operating mode, and FIG. 3B representing a compute node configured according to a virtual node operating mode. Compute node 112 comprises multiple processor cores 301A, 301B (herein generically referred to as feature 301), two processor cores being present in the preferred embodiment, it being understood that this number could vary. Compute node 112 further comprises a single addressable nodal memory 302 which is used by both processor cores 301; an external control interface 303 which is coupled to the corresponding local hardware control network 114; an external data communications interface 304 which is coupled to the corresponding local I/O tree network 113, and the corresponding six node-to-node links 202 of the torus network; and monitoring and control logic 305 which receives and responds to control commands received through external control interface 303. Monitoring and control logic 305 can access certain registers in processor cores 301 and locations in nodal memory 302 on behalf of control subsystem 102 to read or alter the state of node 112. In the preferred embodiment, each node 112 is physically implemented as a respective single, discrete integrated circuit chip.

From a hardware standpoint, each processor core 301 is an independent processing entity capable of maintaining state for and executing threads independently. Specifically, each processor core 301 contains its own instruction state register or instruction address register 306A, 306B (herein generically referred to as feature 306) which records a current instruction being executed, instruction sequencing logic, instruction decode logic, arithmetic logic unit or units, data registers, and various other components required for maintaining thread state and executing a thread.

Each compute node can operate in either coprocessor mode or virtual node mode, independently of the operating modes of the other compute nodes. When operating in coprocessor mode, the processor cores of a compute node do not execute independent threads. Processor Core A 301A acts as a primary processor for executing the user application process or sub-process assigned to its node, and instruction address register 306A will reflect the instruction state of that process or sub-process, while Processor Core B 301B acts as a secondary processor which handles certain operations (particularly communications related operations) on behalf of the primary processor. When operating in virtual node mode, each processor core executes its own user application process or sub-process independently. A "sub-process" is, from the point of view of the node or virtual node, a process, and the word "sub-process" is used herein only to emphasize that the process executing within a node or virtual node is usually some portion of a larger application process being executed in parallel on many nodes. The instruction states of these independent processes are reflected in the two separate instruction address registers 306A, 306B, although these processes may be, and usually are, separate sub-processes of a common user application. Because each node effectively functions as two virtual nodes, the two processor cores of the virtual node constitute a fourth dimension of the logical three-dimensional lattice 201. I.e., to specify a particular virtual node (a particular processor core and its associated subdivision of local memory), it is necessary to specify an x, y and z coordinate of the node (three dimensions), plus a virtual node (either A or B) within the node (the fourth dimension).

As described, functional network 105 services many I/O nodes, and each I/O node is shared by multiple compute nodes. It should be apparent that the I/O resources of massively parallel system 100 are relatively sparse in comparison with its computing resources. Although it is a general purpose computing machine, it is designed for maximum efficiency in applications which are compute intensive. If system 100 executes many applications requiring large numbers of I/O operations, the I/O resources will become a bottleneck to performance.

In order to minimize I/O operations and inter-nodal communications, the compute nodes are designed to operate with relatively little paging activity from storage. To accomplish this, each compute node contains its own complete copy of an operating system (operating system image) in nodal memory 302, and a copy of the application code being executed by the processor core. Unlike conventional multi-tasking system, only one software user application process or sub-process is active at any given time. As a result, there is no need for a relatively large virtual memory space (or multiple virtual memory spaces) which is translated to the much smaller physical or real memory of the system's hardware. The physical size of nodal memory limits the address space of the processor core.

As shown in FIG. 3A, when executing in coprocessor mode, the entire nodal memory 302 is available to the single software application being executed. The nodal memory contains an operating system image 311, an application code image 312, and user application data structures 313 as required. Some portion of nodal memory 302 may further be allocated as a file cache 314, i.e., a cache of data read from or to be written to an I/O file.

Operating system image 311 contains a complete copy of a simplified-function operating system. Operating system image 311 includes certain state data for maintaining process state. Operating system image 311 is preferably reduced to the minimal number of functions required to support operation of the compute node. Operating system image 311 does not need, and preferably does not contain, certain of the functions normally contained in a multi-tasking operating system for a general purpose computer system. For example, a typical multi-tasking operating system may contain functions to support multi-tasking, different I/O devices, error diagnostics and recovery, etc. Multi-tasking support is unnecessary because a compute node supports only a single task at a given time; many I/O functions are not required because they are handled by the I/O nodes 111; many error diagnostic and recovery functions are not required because that is handled by control subsystem 102 or front-end nodes 103, and so forth. In the preferred embodiment, operating system image 311 contains a simplified version of the Linux operating system, it being understood that other operating systems may be used, and further understood that it is not necessary that all nodes employ the same operating system.

Application code image 302 is preferably a copy of the application code being executed by compute node 112. Application code image may contain a complete copy of a computer program which is being executed by system 100, but where the program is very large and complex, it may be subdivided into portions which are executed by different respective compute nodes.

Referring to FIG. 3B, when executing in virtual node mode, nodal memory 302 is dynamically subdivided into a respective separate, discrete memory subdivision 321A, 321B (herein generically referred to as feature 321) for each processor core. In the preferred embodiment, these memory subdivisions are contiguous regions of nodal memory as represented in FIG. 3B, although it should be understood that it would alternatively be possible to use non-contiguous subdivisions. At any instant of time, some additional unattached portion 322 of nodal memory 302, which is not a part of either processor's subdivision, may exist. Unattached portion 322 is available for use in expansion of either or both memory subdivision 321A, 321B.

In virtual node mode each subdivision 321 contains its own copy of operating system image 323A, 323B (herein generically referred to as feature 323). Like operating system image 311 used in coprocessor mode, operating system image 323 is an image of a reduced-function operating system, preferably a reduced-function Linux operating system. In the preferred embodiment all compute nodes use the same reduced function operating system, and the instruction code contained in the various operating system images 311, 321 is identical (although state data embedded in the image may, of course, vary). However, since system hardware is general and each compute node executes its instructions independently, it would conceivably be possible to employ different operating systems in different compute nodes, and even to employ different operating systems for different processor cores in the same compute node when operating in virtual node mode.

In virtual node mode, each subdivision 321 further contains its own copy of a respective application code image 324A, 324B (herein referred to generically as feature 324) as well as any application data structures 325A, 325B and file caches 326A, 326B required to support the process being executed by the associated processor core. Since each node executes independently, and in virtual node mode, each co-processor has its own nodal memory subdivision 321 maintaining an independent state, application code images 324 within the same node may be different, not only in state data but in the executable code contained therein. Typically, in a massively parallel system, blocks of compute nodes are assigned to work on different user applications or different portions of a user application, and within a block all the compute nodes might be executing sub-processes which use a common application code instruction sequence. However, it is possible for every compute node 111 in system 100 to be executing the same instruction sequence, or for every compute node to be executing a different respective sequence using a different respective application code image.

In virtual node mode, each subdivision 321 further contains its own image of a memory regulation daemon 327A, 327B (herein referred to generically as feature 327). Memory regulation daemon 327 is executable code for managing the amount of memory within subdivision 321, and its thus a form of computer program. Memory regulation daemon requests acquisition of additional unused memory from unattached memory 322 where necessary, and approves requests for additional unattached memory from another processor within the same node. The operation of memory regulation daemon 327 is described in greater detail herein.

In either coprocessor or virtual node operating mode, the entire addressable memory of each processor core 301 is contained in the local nodal memory 302. Unlike certain computer architectures such as so-called non-uniform memory access (NUMA) systems, there is no global address space among the different compute nodes, and no capability of a processor in one node to address a location in another node. When operating in coprocessor mode, the entire nodal memory 302 is accessible by each processor core 301 in the compute node. When operating in virtual node mode, a single compute node acts as two "virtual" nodes. This means that nodal memory 302 is configured to appear as separate entities to each operating system 323. To operating system 323A, it appears that the only physical memory on the system is the memory in memory subdivision 321A (and similarly for operating system 323B). Accordingly, a processor core 301 only accesses memory locations in its own discrete memory subdivision 321. In the representation of FIG. 3B, processor core 301A accesses only memory locations in subdivision 321A, and processor core 301B accesses only memory locations in subdivision 321B. Neither processor core accesses memory locations in the other's memory subdivision, or in unattached portion 322 (although through the daemon it can request that some or all of unattached portion 322 be added to its own subdivision).

While a system having certain types of nodes and certain inter-nodal communications structures is shown in FIGS. 1 and 2, and a typical node having two processor cores and various other structures is shown in FIGS. 3A and 3B, it should be understood that FIGS. 1, 2, 3A and 3B are intended only as a simplified example of one possible configuration of a massively parallel system for illustrative purposes, that the number and types of possible devices in such a configuration may vary, and that the system often includes additional devices not shown. In particular, the number of dimensions in a logical matrix might vary; and a system might be designed having a greater number of processors in each node. While various system components have been described and shown at a high level, it should be understood that a typical computer system contains many other components not shown, which are not essential to an understanding of the present invention. Furthermore, various software entities are represented conceptually in FIGS. 3A and 3B as blocks or blocks within blocks of local memory 302. However, it will be understood that this representation is for illustrative purposes only, and that particular modules or data entities could be separate entities, or part of a common module or package of modules, and need not occupy contiguous addresses in local memory. Furthermore, although a certain number and type of software entities are shown in the conceptual representations of FIGS. 3A and 3B, it will be understood that the actual number of such entities may vary and in particular, that in a complex computer system environment, the number and complexity of such entities is typically much larger.

In accordance with the preferred embodiment of the present invention, when operating in virtual node mode, nodal memory is subdivided in variable sized subdivisions for each processor, i.e., for each virtual node. One subdivision begins at the bottom of memory (i.e., the lowest real memory address in nodal memory) and extends upwards, while the other begins at the top of memory and extends downward. A pair of moveable boundaries marks the end of each respective memory subdivision 221. The memory, if any, between the pair of moveable boundaries is unattached memory 222, which is available for attaching to either subdivision by moving the corresponding boundary to include all or a portion of the unattached memory.

The movement of the boundaries is regulated by a pair of memory regulation daemons 227, a respective daemon corresponding to each processor (virtual node). The daemon performs two tasks: (a) it requests that the other processor's daemon approve a proposed movement of the boundary to attach at least some unattached memory to the subdivision of the requesting daemon; and (b) it receives requests to move the boundary from the other daemon and either approves or denies the requests. Because these are two separate tasks, each daemon 227 represented in FIG. 3B may in fact be two separate daemons which share certain common state data, one of the daemons performing task (a) and the other performing task (b). For clarity, the daemon 227 is referred to herein as a single entity, it being understood that it may comprise two (or more) daemons.

In the preferred embodiment, among the state data maintained in each daemon 227 is the upper boundary of Processor Core A's memory subdivision 221A (herein referred to as Boundary_A) and the lower boundary of Processor Core B's memory subdivision 221B (herein referred to as Boundary B). Since processes executing in one subdivision can not access memory in the other subdivision, it is necessary for each daemon to maintain its own copy of Boundary_A and Boundary_B. It will be understood that it would alternatively be possible to maintain memory subdivision state data in other forms, particularly where memory subdivisions are non-contiguous.

Figure 4:
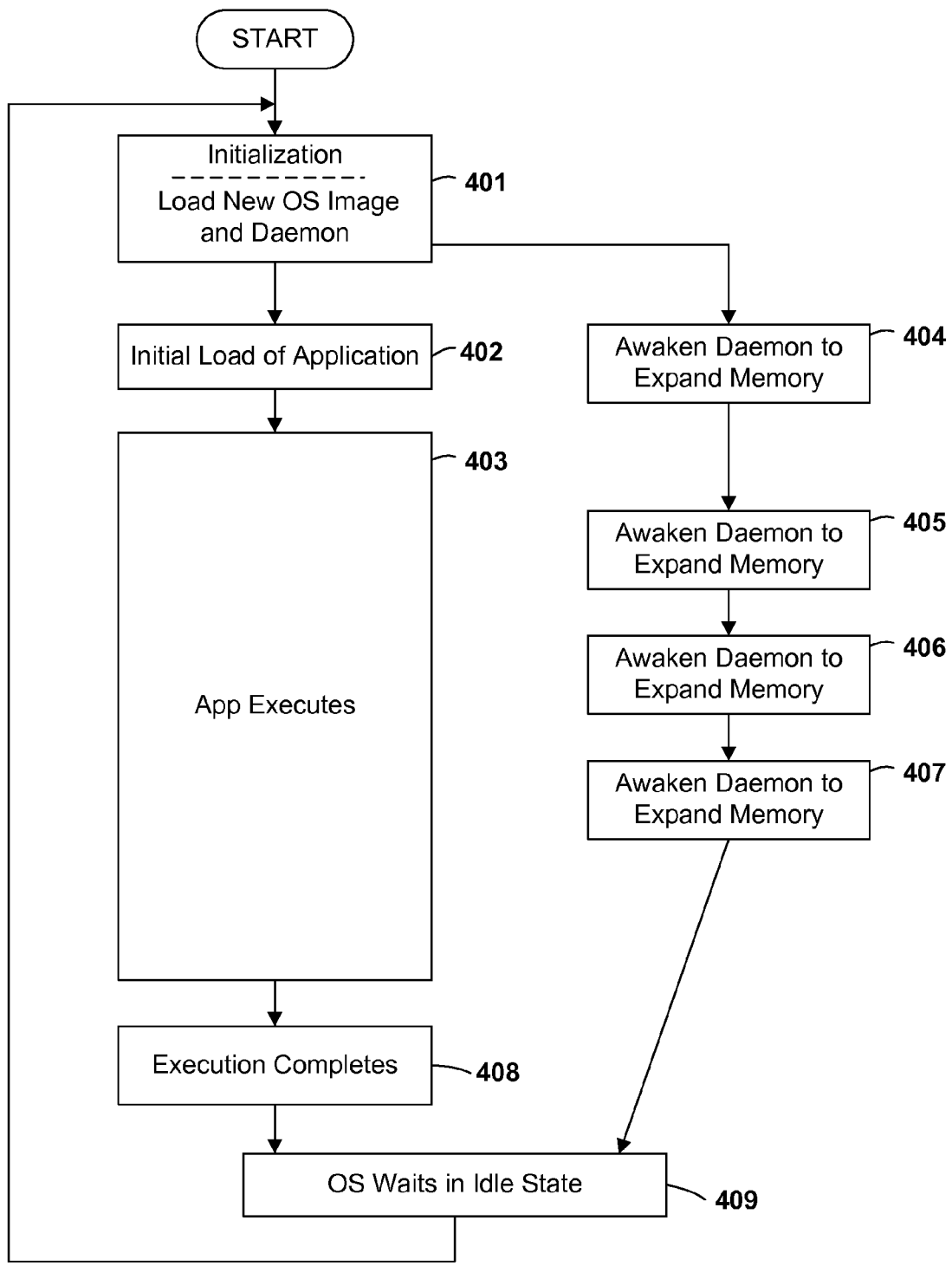
FIG. 4 is a flow diagram representing at a high level the execution of a process or sub-process within one of the virtual nodes, according to the preferred embodiment.

FIG. 4 is a flow diagram representing at a high level the execution of a process or sub-process within one of the virtual nodes. To initiate the process, a new copy of the operating system image 321 and daemon 327 is loaded into local memory at a pre-determined location (step 401) The new OS image contains default state data in the image, and in particular contains a default memory configuration value in which the memory subdivision 322 has a minimum amount of memory. The value of Boundary_A and Boundary_B are set accordingly. Typically, if the node is operating in virtual node mode, both nodes are initialized and loaded with respective operating system images having default values simultaneously. However, it would alternatively be possible to load each one independently. In the latter case, the boundary of the already loaded (and executing) subdivision must be properly initialized. E.g., if subdivision A is already executing and subdivision B is initialized with a new copy of its operating system, the value of Boundary_A stored in subdivision B's daemon must be initialized, since it can not be assumed that it is the default value. This value may be initialized by sending a message to processor A, requesting it to transmit the appropriate value of Boundary_A. At the same time, the processor A will reset its own value of Boundary_B to the default.

With the virtual node initialized, the application is loaded into the memory subdivision and called for execution (step 402). The application code may be loaded all at once, or some portion may be loaded initially, the rest being loaded on demand during execution. The application then commences execution and continues until complete (step 403).

While executing, the memory regulation daemon may be periodically awakened to move the corresponding memory boundary, thus attaching more memory to the subdivision in which the application process is executing to meet the needs of the executing process. Periodic awakening of the daemon is represented in FIG. 4 as steps 404-407, and is described in greater detail herein with respect to FIGS. 5 and 6. FIG. 4 represents the daemon being awakened four times, it being understood that this number may vary, and could be much larger.

At some point, execution of application process completes (step 408). The operating system then waits in an idle state, its memory structures intact (step 409). Specifically, while in idle state, the operating system does not attempt to alter the boundaries of the memory subdivision, even if it would be possible to free up memory by cleaning up data structures or other means. Once memory has been attached to the subdivision, it remains in the subdivision until a new process is re-initialized. During the period that the operating system is in idle state after completion of execution, the daemon may receive additional requests from the other virtual node for additional nodal memory to be attached to the other virtual node's subdivision, and will respond to these requests appropriately. At some point, an event occurs requiring re-initialization of the node and execution of a new process, shown in FIG. 4 as a return to step 401. Only then will any previously attached nodal memory become detached from the virtual node's memory subdivision, and the memory subdivision reset to default boundaries.

Figure 5:
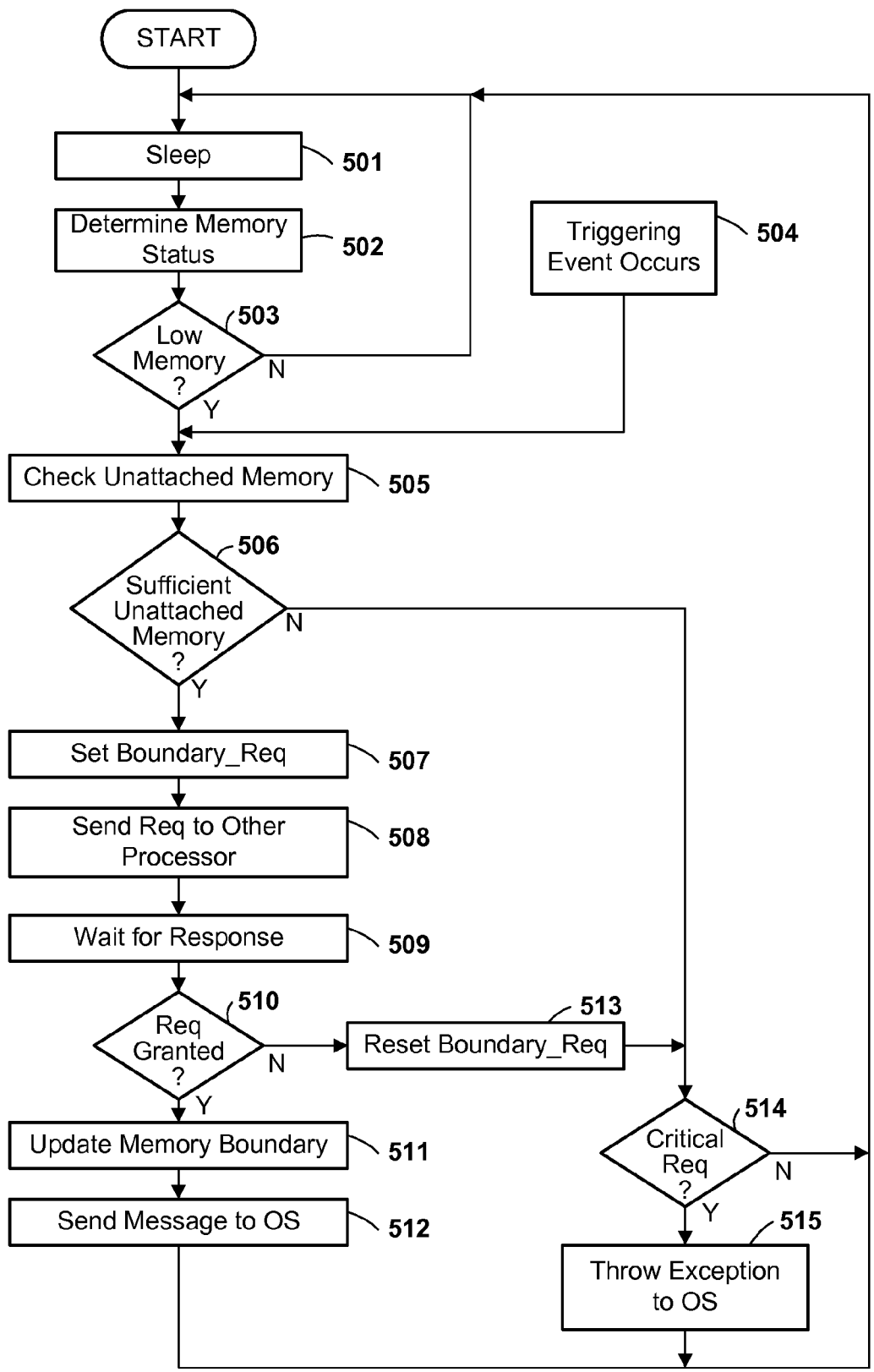
FIG. 5 is a flow diagram representing the daemon-executed process of requesting and obtaining additional memory for a subdivision, according to the preferred embodiment.

FIG. 5 is a flow diagram representing the daemon-executed process of requesting and obtaining additional memory for a subdivision, according to the preferred embodiment. Referring to FIG. 5, a daemon for obtaining additional memory for the subdivision is normally in a dormant or sleep state, represented as step 501. The daemon is periodically awakened to check the status of the subdivision's memory. When awakened, the daemon determines current memory utilization to detect a low memory condition (step 502). Preferably, low memory is detected by determining the proportion of memory in the subdivision which is actually being used, and detecting a low memory if the proportion exceeds some pre-determined threshold. However, a daemon could use any of a variety of alternative techniques involving other and/or additional considerations to detect low memory, e.g., known size of application image 324 stored in the application file header, volume of activity in the file cache, etc. If low memory is not detected (the 'N' branch from step 503), the daemon returns to the dormant state. If a low memory condition exists, the daemon takes the 'Y' branch from step 503 and will attempt to obtain additional memory.

In addition to periodic awakening to check memory status as represented by steps 502-503, the daemon is automatically awakened upon the occurrence of some triggering event, such as an out-of-memory exception. I.e., the executing application or operating system may require memory immediately which is unavailable, causing the system to generate an out-of-memory exception condition (represented as step 504). Generally, an out-of-memory exception means that the current application will be unable to continue execution unless additional memory can be obtained immediately, and is therefore constitutes a critical need for memory. Other less critical triggering events are also possible.

The daemon then determines whether sufficient unattached memory exists by subtracting Boundary_A from Boundary_B (step 505). If insufficient unattached memory exists, the 'N' branch is taken from step 506, and no memory request is sent to the other processor, since the daemon knows in advance that it will be impossible to satisfy the memory request.

For critical requests, it is generally necessary to satisfy the full amount of additional memory determined necessary by the operating system. However, for a prospective request triggered because the daemon detected low memory, if at least some unattached memory exists, the 'Y' branch will be taken from step 506. In this case the request will be limited to the actual unattached memory or an amount determined by the daemon as sufficient to remedy the low memory condition, whichever is less.

The daemon then sets a requested memory boundary (Boundary_Req) to the current boundary of the daemon's subdivision adjusted by the amount of unattached memory to be requested (step 507). I.e., if the request is made from Processor Core A, then Boundary_Req is set to Boundary_A+Amt_of_requested_additional_memory, and similarly if the request is made from Processor Core B, then Boundary_Req is set to Boundary_B−Amt_of_requested_additional_memory. The Boundary_Req is used to avoid conflicting attachment of the same memory as a result of multiple simultaneous in-flight request for additional memory.

The daemon then transmits a memory request to the other processor's daemon (step 508. The transmitted request specifies an amount of additional memory requested, and preferably a reason or priority code associated with the request. A request is transmitted by passing a message to the other processor using a bus protocol, each processor having one or more bus addresses for this purpose. As explained previously, in the preferred embodiment there is no capability to directly access memory in the other processor's subdivision, and hence it is not possible to send a message by placing data in a mutually accessible memory location.

In the preferred embodiment, the request specifies one of three priority levels, herein designated critical (the highest), medium and low. A critical request is one which is triggered by an out-of-memory exception or similar event for which the application will abort if the request is not granted. Medium and low priority requests are triggered by the daemon detecting a low memory condition at step 503. The distinction between medium and low priority requests could be based on different low memory thresholds, e.g., if allocated memory exceeds a first threshold, a medium priority request is generated, and if it exceeds a second threshold lower than the first, a low priority request is generated. However, other and/or additional considerations as mentioned above could alternatively be used for distinguishing between low and medium priority requests. For example, low priority requests could be those which are intended to increase the size of file cache. Although three priority levels are used in the preferred embodiment, the number of priorities could vary, and other priorities or reasons could be assigned to a request. The information is called a "priority" herein because it affects the conditions under which the request will be granted, but it will be understood that a "reason" code associated with a request is essentially interchangeable with a priority, since the receiving daemon will use the reason code to make its decision whether to grant the request. In general there should be a distinction between requests which are required to continue execution of the application process (and hence have a relatively higher priority) and requests which are made prospectively in anticipation of future needs (and hence have a relatively lower priority). However, in an alternative embodiment, it would be possible to not provide any priority or reason associated with a request.

The daemon waits to receive a response from the other processor's daemon (step 509). Upon receiving a response, if the request is granted, the 'Y' branch is taken from step 510. In this case the memory boundary of the requesting processor's subdivision (Boundary_A or Boundary_B, as the case may be) is updated to reflect the additional memory added by the request (step 511). The daemon then sends a message to its operating system confirming the additional memory (step 512). The operating system sees this message as an attachment of additional memory, just as if a new memory card had been physically plugged into a system. The operating system therefore responds by updating its internal memory mapping structures to reflect the existence of the additional memory. If the memory request had been made in response to an out-of-memory exception, the OS returns to the point at which the exception was generated, and the program resumes execution.

In the event that the request was not granted, the 'N' branch is taken from step 510. The temporary boundary of requested memory (Boundary_Req) is then reset, adjusted by the amount of the denied request (step 512). If the request was a critical request (the 'Y' branch from step 514), the daemon then throws the out-of-memory exception (or similar critical exception) back to the operating system for handling (step 515), which typically causes the program to abort. If the request was non-critical (the 'N' branch from step 514), there is nothing further for the daemon to do, and the daemon goes back to sleep. The request may be renewed at a later time.

Figure 6:
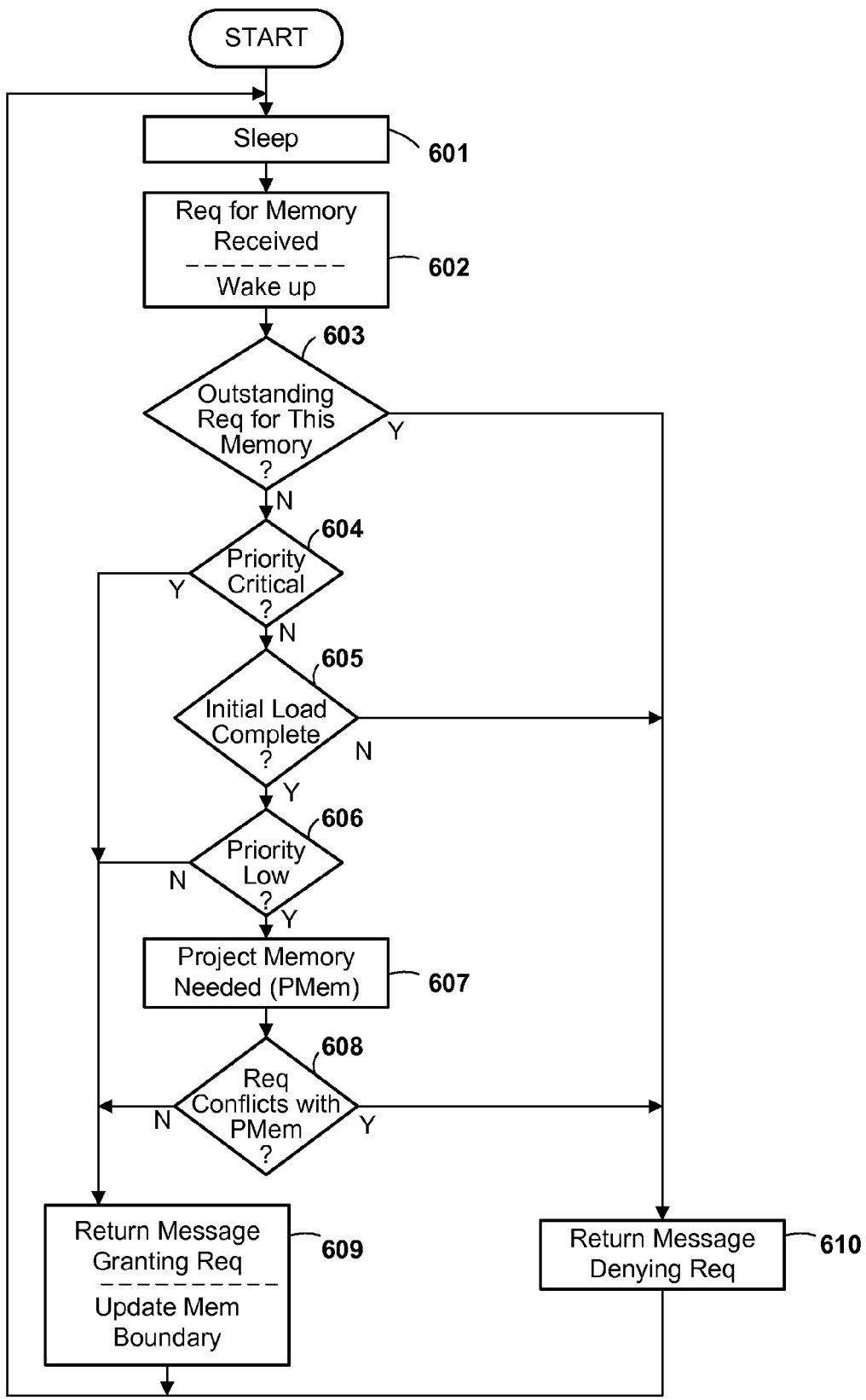
FIG. 6 is a flow diagram representing the daemon-executed process of responding to a request for additional subdivision memory, according to the preferred embodiment.

FIG. 6 is a flow diagram representing the daemon-executed process of responding to a request for additional subdivision memory received from a memory regulation daemon in a different subdivision (virtual node) within the same physical node, according to the preferred embodiment. Referring to FIG. 6, the portion of the daemon which responds to memory requests is normally asleep, represented as step 601. It is awakened when the processor receives a request for additional memory from the other virtual node using a bus message protocol (represented as step 602).

The daemon checks the requested memory boundary to determine whether the request received from the other virtual node would conflict with any outstanding request it has made for additional subdivision memory (step 603). If there is a conflict, the 'Y' branch is taken from step 603, and the processor returns a message denying the request (step 610). Note that it is possible for separate requests to be pending from each virtual node, and for one or both to be granted, provided they don't conflict with each other.

If there is no conflicting request outstanding, the 'N' branch is taken from step 603. In this case, if the received request had a critical priority, then the 'Y' branch is taken from step 604. In this case, the request is immediately granted by returning an appropriate message using the bus message protocol, and by updating the memory boundary of the requesting virtual node as recorded in the non-requesting virtual node (step 609). A critical priority request is one which was caused by an out-of-memory exception generated by the OS, and therefore would cause the program being executed by the requesting virtual node to abort if the request is not granted. In such a case, the request should always be granted unless the requirements of data integrity demand otherwise.

If the request was not critical (the 'N' branch from step 604), the daemon determines whether its operating system has completed start-up and initial loading of the application program. If start-up and initial load is not complete, it is very difficult to project memory requirements or usage for the subdivision of the daemon, and in this case all but critical memory requests should be denied. Accordingly, the 'N' branch is taken from step 605, and a message denying the request is sent at step 610.

If, at step 605, the initial load was completed, then the 'Y' branch is taken. In this case, if the priority of the memory request was not low, the 'N' branch is taken from step 606 and the request is granted (step 609). If the priority is low (indicating no urgent need by the requester), then the daemon makes a projection of memory needed (PMem) for its own subdivision (step 607). Such a projection could use any of various formulae, and the daemon may need to make one or more operating system calls to obtain the underlying data necessary for the projection. For example, it could be as simple as multiplying currently allocated memory by some arbitrary constant greater than one. However, it could also be some more sophisticated measure. E.g., it could take into account memory pages which have been malloced by the operating system for future use, but for which no memory has yet been allocated, or any of various other factors which may affect future memory needs.

If the low priority request does not conflict with memory needs projected at step 607, the 'N' branch is taken from step 608, and the request is granted (step 609). If the request conflicts projected memory needs, the 'Y' branch is taken from step 608 and the request is denied (step 610). In either case, the daemon portion which responds to memory requests then returns to its dormant state at step 601.

In the algorithm described above as a preferred embodiment and certain variants, pair of daemons which are separate from the operating system regulate the attachment of memory to the subdivisions by passing requests to each other. However, it will be understood that any of various memory regulation mechanisms could alternatively used, and that such mechanisms could be integral with, or separate from, the operating system. In particular, although a pair of peer mechanisms in each respective subdivision is used according to the preferred embodiment, it would alternatively be possible to use a single arbitration mechanism, executing in one of the subdivisions or in its own discrete subdivision, to regulate memory subdivisions of a node.

In general, the routines executed to implement the illustrated embodiments of the invention, whether implemented as part of an operating system or a specific application, program, object, module or sequence of instructions, are referred to herein as "programs" or "computer programs". The programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, volatile and non-volatile memory devices, floppy disks, hard-disk drives, CD-ROM's, DVD's, magnetic tape, and so forth. Furthermore, the invention applies to any form of signal-bearing media regardless of whether data is exchanged from one form of signal-bearing media to another over a transmission network. Examples of signal-bearing media are illustrated in FIG. 1 as storage devices 109, 125 and control subsystem memory 122, and in FIGS. 3A and 3B as local memory 302.

Although the embodiments of the invention herein are intended for use with a massively parallel nodal computer system, the invention is not restricted to any particular number of nodes or required to have any of the various architectural features typical of a massively parallel system, other than those explicitly recited in the claims herein. The present invention could be used in a nodal system having a relatively small number of nodes.

Although a specific embodiment of the invention has been disclosed along with certain alternatives, it will be recognized by those skilled in the art that additional variations in form and detail may be made within the scope of the following claims:

What is claimed is:

1. A computer program product for regulating memory in a first node of a computer system having a plurality of nodes, each said node having a respective plurality of processors and a respective common physical nodal memory accessible only to processes executing on one or more of the respective processors within the node, said computer program product comprising:

a plurality of computer-executable instructions recorded on signal-bearing media, wherein said instructions, when executed by at least one computer system, cause the at least one computer system to perform the steps of:

configuring said first node as a plurality of virtual nodes for executing respective processes, each process executing in a respective said virtual node, each virtual node having a respective disjoint subset of the respective plurality of processors of said first node, each said disjoint subset containing at least one of said plurality of processors for executing processes in the respective virtual node, and a respective discrete non-overlapping subdivision of said common physical nodal memory for use by processes executing within the respective virtual node, the discrete non-overlapping subdivisions of said common physical nodal memory being defined by at least one nodal memory configuration parameter stored in said computer system, wherein each process is unable to access nodal memory outside the respective subdivision of said common physical nodal memory of the virtual node in which the process is executing;

sending a request on behalf of a user process executing within a first virtual node of said plurality of virtual nodes to dynamically enlarge the size of the subdivision of said common physical nodal memory of said first virtual node for use by the user process, said request being sent by a first memory regulating process executing in said first virtual node to a second memory regulating process executing in a second virtual node of said plurality of virtual nodes;

responsive to sending said request, granting said request, said request being granted by said second memory regulating process; and responsive to granting said request, dynamically altering at least one nodal memory configuration parameter of said at least one nodal memory configuration parameter to enlarge the size of said subdivision of said common physical nodal memory of said first virtual node during execution of said user process for use by the user process, said dynamically altering step being performed by said first memory regulating process.

2. The computer program product of claim 1, wherein said request includes an amount of additional memory requested and priority data associated with the request.

3. The computer program product of claim 1, wherein said program product comprises a daemon for performing, in each respective node, the steps of: (a) as a daemon for a requesting virtual node, sending a request from the requesting virtual node to another virtual node, said request requesting that the subdivision of the requesting virtual node be enlarged, and (b) as a daemon for a virtual node other than a requesting virtual node, granting a request received from a requesting virtual node requesting the subdivision of the requesting virtual node be enlarged.

4. The computer program product of claim 1, wherein said step of dynamically altering at least one nodal memory configuration parameter of said at least one nodal memory configuration parameter to enlarge the size of at least one subdivision further comprises the steps of:

accessing a record of said memory subdivisions to determine whether available memory exists for granting said request, wherein said sending a request step is performed only if said accessing a record step determines that available memory exists for granting said request.

5. The computer program product of claim 1, wherein said computer program product further performs the steps of:

monitoring available unused memory in each respective said subdivision to determine whether a need exists for additional memory within the subdivision; and responsive to determining that a need exists for additional memory within the subdivision, performing said steps of sending a request, granting said request, and dynamically enlarging the size of the subdivision.

6. The computer program product of claim 1, wherein said step of configuring said first node as a plurality of virtual nodes for executing respective processes comprises configuring said common physical nodal memory as said plurality of discrete non-overlapping subdivisions and a discrete portion of unattached memory not included in any of said discrete non-overlapping subdivisions; and wherein said step of dynamically altering at least one nodal memory configuration parameter of said at least one nodal memory configuration parameter to enlarge the size of said subdivision of said common physical nodal memory of said first virtual node comprises attaching at least a portion of said unattached memory to the subdivision of said common physical nodal memory of said first virtual node.

7. The computer program product of claim 1, wherein said step of dynamically altering at least one nodal memory configuration parameter of said at least one nodal memory configuration parameter to enlarge the size of said subdivision during execution of said user process causes said subdivision to be enlarged for the remaining duration of the user process.

8. The computer program product of claim 7, wherein a size of a memory subdivision which was dynamically enlarged by said dynamically altering step is restored to a default state after termination of a respective user process for which the subdivision was dynamically enlarged upon initialization of a user process subsequent to the respective user process for which the subdivision was dynamically enlarged.

9. A parallel processing computer system, comprising:

a plurality of nodes, each said node having a respective plurality of processors and a respective common physical nodal memory accessible only to processes executing on one or more of the respective processors within the respective node;

wherein each node of said plurality of nodes is configurable as a plurality of virtual nodes for executing respective processes, each process executing in a respective said virtual node, each virtual node having a respective disjoint subset of the respective plurality of processors of the respective node, each said disjoint subset containing at least one of said plurality of processors for executing processes in the respective virtual node, and a respective discrete non-overlapping subdivision of said common physical nodal memory for use by processes executing within the respective virtual node, the discrete non-overlapping subdivisions of said common physical nodal memory being defined by at least one nodal memory configuration parameter stored in said computer system, and wherein each said process is unable to access nodal memory outside the respective subdivision of said common physical nodal memory of the virtual node in which the process is executing;

a respective nodal memory management mechanism resident in at least some of said plurality of nodes, each said at least some of said plurality of nodes being configured as a respective plurality of virtual nodes, each said nodal memory management mechanism comprising a respective memory regulating process executing in each said virtual node of the respective node in which the respective nodal memory management mechanism resides, each said respective nodal memory management mechanism dynamically adjusting the size of a respective discrete subdivisions of said common physical nodal memory of the respective node in which the nodal memory management mechanism resides by:

(a) sending a request on behalf of a respective user process executing within a first virtual node of the respective plurality of virtual nodes of the respective node within the respective nodal memory management mechanism resides, said request to enlarge the size of the subdivision of the common physical nodal memory of said first virtual node for use by the respective user process, said request being sent by a first memory regulating process executing in the respective first virtual node to a second memory regulating process executing in a second virtual node of the respective plurality of virtual nodes;

(b) responsive to sending said request, granting said request, said request being granted by said second memory regulating process; and (c) responsive to granting said request, dynamically altering at least one nodal memory configuration parameter of said at least one nodal memory configuration parameter to enlarge the size of the subdivision of the common physical nodal memory of said first virtual node during execution of the respective user process for use by the respective user process, the at least one nodal memory configuration parameter of said at least one nodal memory configuration parameter being dynamically altered by said first memory regulating process.

10. The computer system of claim 9, wherein each said nodal memory management mechanism comprises a respective plurality of peer processes, each peer process executing in a respective one of said virtual nodes, each peer process sending requests from the virtual node in which it resides to at least one other virtual node requesting that the subdivision of the requesting virtual node be enlarged, and granting requests received from said at least one other virtual node requesting that a subdivision of the requesting virtual node be enlarged.

11. The computer system of claim 9, wherein each said request includes an amount of additional memory requested and priority data associated with the request.

12. The computer system of claim 9, wherein each said common physical nodal memory of said at least some of said plurality of nodes configured as a respective plurality of virtual nodes is configured as a respective plurality of discrete subdivisions and a respective discrete portion of unattached memory not included in any of said discrete subdivisions; and wherein each said nodal memory management mechanism dynamically enlarges the size of at least one respective subdivision by attaching at least a portion of said respective discrete portion of unattached memory to the at least one subdivision being enlarged.

* * * * *